US012003427B2

(12) United States Patent
Vera Rodriguez et al.

(10) Patent No.: US 12,003,427 B2
(45) Date of Patent: Jun. 4, 2024

(54) INTEGRATED ENVIRONMENT MONITOR FOR DISTRIBUTED RESOURCES

(71) Applicant: NCR Voyix Corporation, Atlanta, GA (US)

(72) Inventors: Isidro Alfonso Vera Rodriguez, Gijon (ES); Mayur Aggarwal, Haryana (IN); Yung-Hang Chang, Marietta, GA (US); Nitin Gaurav, Haryana (IN); Kun Zhu, Smyrna, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/855,397

(22) Filed: Jun. 30, 2022

(65) Prior Publication Data

US 2024/0007417 A1    Jan. 4, 2024

(51) Int. Cl.
*H04L 47/70*    (2022.01)
*H04L 47/80*    (2022.01)

(52) U.S. Cl.
CPC .......... *H04L 47/822* (2013.01); *H04L 47/808* (2013.01); *H04L 47/826* (2013.01)

(58) Field of Classification Search
CPC .... H04L 47/822; H04L 47/808; H04L 47/826
See application file for complete search history.

(56) References Cited

U.S. PATENT DOCUMENTS

| | | | |
|---|---|---|---|
| 11,070,452 B1* | 7/2021 | Roy | H04L 43/045 |
| 11,093,518 B1* | 8/2021 | Lu | G06F 11/3476 |
| 11,582,316 B1* | 2/2023 | Danyi | H04L 67/146 |
| 2015/0081470 A1* | 3/2015 | Westphal | G06Q 30/0631 |
| | | | 705/26.7 |
| 2015/0195410 A1* | 7/2015 | de Castro | H04M 3/567 |
| | | | 455/416 |
| 2016/0087844 A1* | 3/2016 | Nair | H04L 67/125 |
| | | | 709/203 |
| 2016/0306965 A1* | 10/2016 | Iyer | G06Q 10/0635 |
| 2017/0104658 A1* | 4/2017 | Sykes | H04L 41/044 |
| 2018/0096323 A1* | 4/2018 | Baber | G06Q 20/4012 |
| 2019/0386891 A1* | 12/2019 | Chitalia | G06F 3/0481 |
| 2022/0350724 A1* | 11/2022 | Kumar KN | G06F 16/21 |

* cited by examiner

*Primary Examiner* — Mohamed A. Wasel
*Assistant Examiner* — Jihad K Boustany
(74) *Attorney, Agent, or Firm* — Schwegman Lundberg & Woessner, P.A.

(57) ABSTRACT

Resource metrics are obtained for resources from distributed resources associated with operations of an enterprise. Metric types from the distributed resources defined in the metrics are grouped and aggregated into aggregated metric types within a data model. Each aggregated metric type data value of the data model is weighed. The weighted aggregated data values are used to calculate an overall service health value of the enterprise. A current instance of the data model is processed to render one or more single views within an interface to a user of the enterprise. Each single view includes the overall service health value along with a custom-level of detail for each aggregated metric type and the corresponding aggregated metric data values.

18 Claims, 7 Drawing Sheets

INTEGRATED ENVIRONMENT MONITOR FOR DISTRIBUTED RESOURCES

BACKGROUND

Retailers today operate substantially differently than they did just a decade ago. Retailers are more heavily reliant on third-party vendors for both their hardware and software assets. In fact, many retailers have a mix of their own managed assets and a plurality of third-party vendor supplied assets.

Each retailer has a Service Level Agreement (SLA) and Service Level Objectives (SLOs) with each of its third-party vendors. An SLA details a formal agreement for an agreed level of service and support that the retailer pays for and that the corresponding vendor agrees to provide. SLOs detail the various objectives that each vendor must hit to satisfy the SLA. Service Level Indicators (SLIs) are the measures or metrics by which the SLOs are measured for compliance.

The challenge for the retailer is that monitoring each SLA and its corresponding SLOs with SLIs for each vendor is time consuming and daunting when there are many different vendors of the retailer. Each vendor has its own system and reports for providing its SLIs that the retailer must access and comprehend.

Furthermore, to access the overall health of the operational assets of the retailer (or of a given store of a given retailer), the retailer has to try and understand how the various SLIs interrelate to get an adequate understanding of how operations are functioning at any given point in time. In fact, even understanding what a single vendor's SLIs mean in relation to that vendor's-supplied assets and the business operations of the retailers is not intuitive at all for most retailers. Most vendors supply too many metrics with their SLIs that do not actually impact operations of a retailer at all.

As a result, retailers are increasingly frustrated with their ability to quickly and accurately access an overall health of their stores at any given point in time.

SUMMARY

In various embodiments, methods and a system for integrated process environment monitoring of distributed resources are presented. Various metrics are captured across different internal and external environments for resources of an enterprise. The metrics are aggregated based on their types, weighted, and an overall health score is calculated for the resources. Combinations of different metric types are also maintained for the resources. The health score and the combinations of metrics are rendered by an interface within a single screen and presented to enterprise users for purposes of accessing an overall health and status of operations for the enterprise at any given point in time.

According to an aspect, a method for integrated process environment monitoring of distributed resources is provided. Specifically, and in one embodiment, metrics for distributed resources of an enterprise are received and the metrics are grouped into the metric types. The metric types are aggregated into aggregated metric types within the data model. Metric data values for each aggregated metric type are weighted producing a weighted aggregated metric value for each aggregated metric type. The weighted aggregated metric values are used to calculate an overall health value for the distributed resources. The overall health value and select aggregations of the metric data values for each aggregated metric type or combinations of the aggregated metric types are rendered within a single view of an interface to a user of the enterprise.

DETAILED DESCRIPTION

Figure 1A:
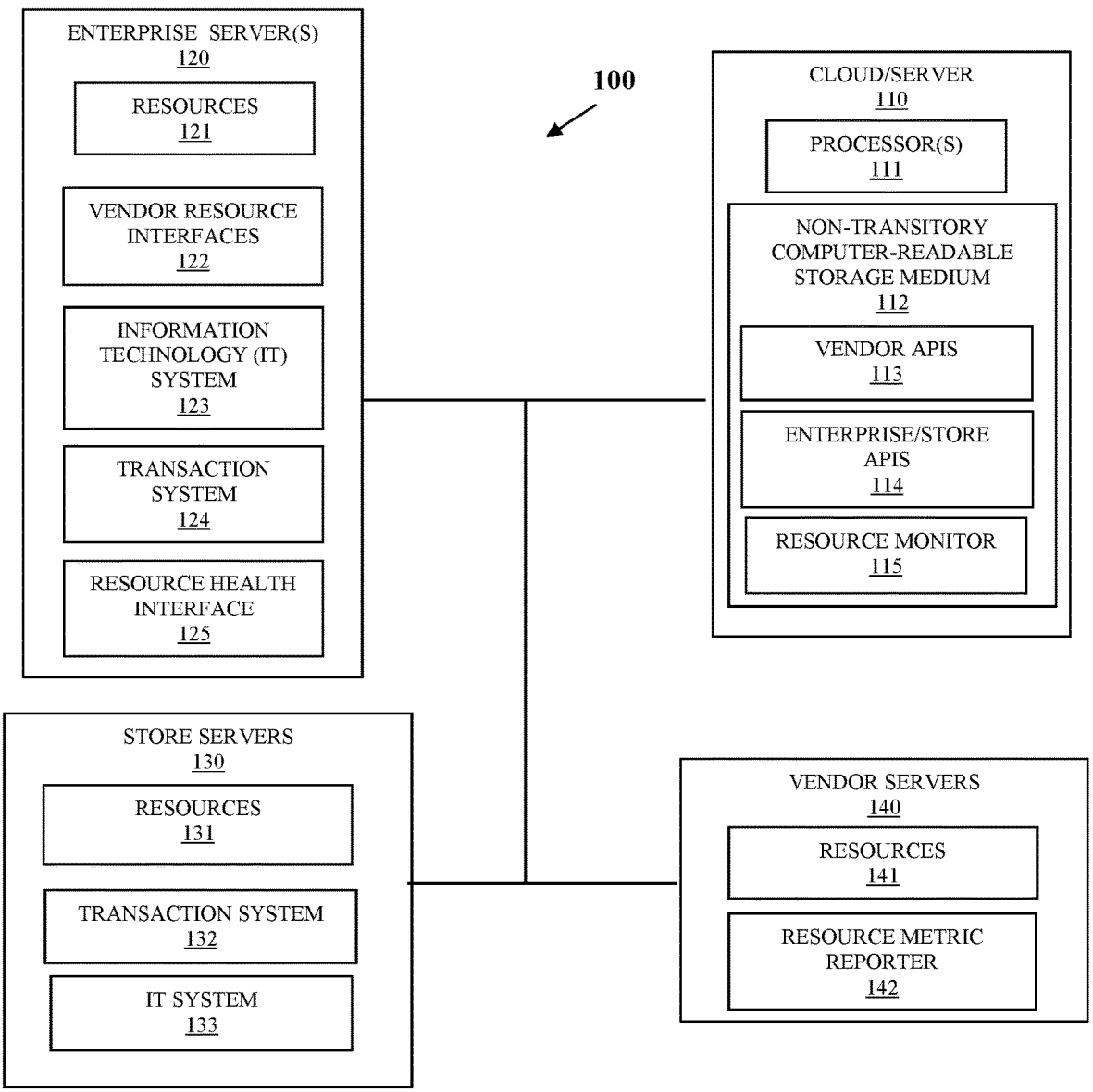
FIG. 1A is a diagram of a system for integrated process environment monitoring of distributed resources, according to an example embodiment.

FIG. 1A is a diagram of a system 100 for integrated process environment monitoring of distributed resources, according to an example embodiment. The system 100 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from integrated process environment monitoring of distributed resources teachings presented herein and below.

System 100 is a significant improvement over what has conventionally been practiced in the industry where enterprises are forced to manually assemble and assimilate metrics for resources from internal and external systems. Embodiments presented herein and below produce a single view (single screenshot within an interface) that provides an ability to quickly access the state of resources and operations of any given enterprise; this is invaluable in today's fast paced and highly competitive environments where decisions and preventative actions need to occur as quickly as possible to avoid catastrophic losses.

Various components are implemented as one or more software modules, which reside in non-transitory storage and/or hardware memory as executable instructions. The executable instructions when executed by one or more hardware processors perform the processing discussed herein and below.

System/Platform 100 provides integrated monitoring and reporting for disparate and distributed resources. A common data model for enterprises and vendors may be provided by which a given enterprise's resources and vendor-provided resources are monitored for health and reported to the corresponding enterprise. Both the internally controlled resources of a given enterprise and the externally controlled resources of each vendor for the corresponding enterprise are monitored in real time. Events from the resources are captured and the corresponding event data are aggregated using the common data model to provide relevant metrics associated with predefined resource categories. The overall health of each category and a comprehensive overall health of the categories combined together are provided within a single view (single screenshot) of an interface.

As used herein, a "resource" includes hardware resources (e.g., memory, devices, processors, storage units, etc.), software resources (e.g., services, applications, systems, etc.), and data assets (for example, information included in storage units). A "system" is a set of cooperating services or applications. Each software resource includes executable instructions residing within a memory (type of hardware resource) or a non-transitory computer-readable storage medium (another type of hardware resource). The executable instructions when provided to or obtained by a processor (type of hardware resource) causes the processor to perform operations, as discussed herein and below with each software resource.

A "metric" is a measure associated with a resource for any configurable period or interval of time. For example, total number of successful or failed transactions, total number of hardware resource uptime or downtime, total number of attempts to penetrate a given network, processing throughput of a given software resource, bandwidth rate or availability, etc.

An "event" is a message or a piece of data that is generated by software and hardware resources during operation. Each event includes event data and an event type. The event type defines the relevancy of the event data to a state or operation of a given resource. Some event data may be metrics in themselves or may be data relevant to one or more metrics. Moreover, an event may be generated by one resource, detected by a different resource, and written to a log or a datastore (another type of resource). Events may persist within volatile memory during operation of the resources and/or may persist in non-volatile memory/storage after operation of the resources. In some cases, the event type is known based on a position of an event within a record or a log/datastore as defined by a schema. In other cases, the event type is tagged within an event message.

A "data model" is a data structure representing a normalized version of the different types of metrics or events between a given enterprise and that enterprise's metrics. A "schema" is a data structure that defines types and formats of metrics of events for any given enterprise and each of that enterprise's metrics. The schema or schemas also provide a translation from event streams (e.g., events and events data, optionally event type, etc.) to the data model.

A "transaction terminal" is a device includes peripherals for which a transaction is performed by a customer. The phrase "transaction terminal" may be used interchangeably and synonymously with the term "terminal." A transaction terminal can be a self-service terminal (SST) or a point-of-sale (POS) terminal. An SST is used to perform self-directed transactions by a customer whereas a POS terminal is used to perform cashier/teller/agent-assisted transactions. A transaction can be to purchase or return an item at a store, check-in for a travel or venue-related matter/service or perform a financial-related matter. Furthermore, an SST can be an automated teller machine (ATM), a travel/venue kiosk, or a retail store self-checkout (SCO).

"Environment," "processing environment," and/or "platform" may be used interchangeably and synonymously. This refers to the processing context for the resources for the hardware and software environment with which executable instructions are processed.

A "enterprise" is intended to include financial institutions, hospitality and/or travel enterprises, retailers, government organizations, non-profit organizations, political or cause-based organizations, etc. That is, the term "enterprise" is not intended to restrict the teachings that follow to any particular type of enterprise.

Referring now to FIG. 1, system 100 includes a cloud 110 or a server 110, one or more retail server(s) 120, store servers 130, and vendor servers 140. It is noted that a collection of servers 100 logically cooperating together provide a cloud processing environment; as such the term "cloud" and "server" may be used interchangeably and synonymously herein and below. That is, system 100 may be provided with one server 110 or a collection of servers 110 organized and operating as a cloud 110.

Server 110 includes at least one processor 111 and a non-transitory computer-readable storage medium 112. Medium 112 includes vendor Application Programming Interfaces (APIs) 113, enterprise/store APIs 114, and a resource monitor 115 each of which includes executable instructions, that when executed by processor 111, cause processor 111 to perform respective corresponding operations discussed herein and below with respect to 113-115.

Each retail server 120 includes resources 121, vendor resource interfaces 122, Information Technology (IT) or data center system 123, transaction system 124, and resource health interface. 122-125 are executable instructions residing in a memory resource 121 or a non-transitory computer-readable storage medium resource 121, which when provided to a processor resource 121 cause the processor resource 121 to perform operations, as discussed herein and below with respect to 122-125.

Each store server 130 includes resources 131, transaction system 132, and IT system 133. 132-133 are executable instructions residing in a memory resource 131 or a non-transitory computer-readable storage medium resource 131, which when provided to a processor resource 131 cause the processor resource 131 to perform operations, as discussed herein and below with respect to 132-133.

Each vendor server 140 includes resources 141 and resource reporting 142. 142 includes executable instructions residing in a memory resource 141 or a non-transitory computer-readable storage medium resource 141, which when provided to a processor resource 141 cause the processor resource 141 to perform operations, as discussed herein and below with respect to 142.

Each transaction system 132 processes in-store transactions of a given enterprise. The in-store transactions are processed by transaction terminals (e.g., a hardware device resource of the corresponding store). A given enterprise's online transactions may be processed by transaction system 124 and/or a given enterprise-provided transaction system (e.g., one of the resources 141).

Each IT system (123 or 133) monitors and manages hardware, software, and data resources for a corresponding enterprise server 120 and corresponding store server 130. IT systems 123 and 133 also maintain versioning (e.g., software and firmware) information for software and hardware resources.

It is to be noted that for some enterprises and/or stores IT system 123 and/or 133 may be provided via a resource 141 associated with a vendor server 140; similar to what was discussed above with respect to enterprise's that permit online transaction system resources 141 to be provided via a vendor server 140.

Initially, a set of metric/event-based schemas are provided to define types of enterprise-based metrics/events provided by transaction systems (124 and 132), IT systems (123 and 133), and vendors' resource metric reporter 142 for vendor-provided resources 141. Each schema also provides a mapping between a given type of metric/event to an aggregated metric/event type in a given data model for a given enterprise.

The data model includes a configurable number of predefined metric/event types for a given enterprise. The data model represents aggregate metric/event types collected from disparate distributed resources (121-125, 131-133, and 141-142) so that an enterprise can quickly assimilate and understand in a single view (e.g., single screenshot) of resource health interface 125 a current state of business and resource health. Presently, there is no ability for enterprises to achieve this capability; rather, enterprises must try and assimilate multiple different internal and vendor-provided dashboards and manually assess an overall state of the business.

In an embodiment, the data model includes 6 predefined aggregate metric types for: 1) in-store orders—ability to monitor in-store ordering to make sure transaction terminals (e.g., a type of resource 131) are operating and SLIs/SLOs are being captured and understood; 2) digital orders—ability to monitor digital ordering to make sure resources 141 and/or transaction system 124 are operating and SLIs/SLOs and are being captured and understood; 3) networking—ability to monitor resources 121, 131, and 141 (e.g., related to network capabilities) to ensure they are operating and ensure SLIs/SLOs are being captured and understood; 4) platform/processing environment—ability to monitor resources 121, 131, and 141 (e.g., related to all electronic operations) to ensure they are operating and ensure SLIs/SLOs are being captured and understood; 5) security—ability to monitor resources 121, 131, and 141 (e.g., related to electronic security) to ensure they are operating, up-to-date, and ensure any relevant SLIs/SLOs are being captured and understood; and 6) dynamic incident management—ability to monitor transactions across every device resource for successful and failed failed payments associated with the transactions including card payments and cash payments.

In an embodiment, separate data models are provided for each enterprise server(s) 120 (each different enterprise that subscribes to and enlists the services provided by server 110). Each enterprise associated with a single data model.

To develop an overall health picture (e.g., tangible measurement) of a given enterprise, each aggregated metric type within that enterprise's data model may be weighted. The weighted aggregated metric values may be used to produce a percentage value (e.g., the sum of the weights is equal to 100%). The percentage value representing an overall health value that provides a tangible measurement of a given enterprise's overall resource and operational state.

In an embodiment and for the example data model provided above, the example aggregated metric types are weighted as: 1) in-store orders weighted 30%; 2) digital orders weighted 30%; 3) networking weighted 10%; 4) platform/environment weighted 10%; 5) security weighted 10%; and 6) transactions for payments weighted 10%. The weights when summed is 100%.

It is to be noted that the percentage weights can be configured based on the enterprise and configured by the enterprise or configured on behalf of the enterprise. In an embodiment, the percentage weights are passed as a processing parameter or are set in a configuration file accessible to resource monitor 115.

The schemas for a given enterprise and its vendors can link the corresponding metric/event types with each vendor's SLIs and/or the SLOs along with the target metric data value and/or the target metric data value range that the enterprise expects to be provided by the vendor for each vendor-specific metric/event type. The data model provides a linkage within the aggregated metric/event types for each vendor's metric/event type back to the target metric data value and/or target metric data value range.

Resource monitor 115 processes vendor APIs 113 to obtain a given enterprise's resource metrics provided through the corresponding resource metric reporter 142. Resource monitor 115 also processes enterprise/store APIs 114 to obtain the corresponding enterprise's resource (121, 123, 123, 131, 132, and 133) metrics. The metrics can be obtained at predefined intervals of time, such as every minute, every 10 minutes, once an hour, etc.

Resource monitor 115 obtains the metric/event types and corresponding metric/event data values associated with each metric/event type and aggregates them in accordance with the translations provided in the schemas into the predefined aggregated metric/event type categories to obtain a current instance of the data model that includes aggregated metric data values for each aggregated metric/event type.

Resource monitor 115 then updates the aggregated metric values for each aggregated metric/event type by multiplying each aggregated metric data value for each aggregated metric/event type by its preassigned weight. The weighted values may then be summed together to obtain an overall service health value for the enterprise and assigned to the current instance of the data model. It is noted that other more complex calculations may be performed to transform the weighted values into the overall service health value.

Resource monitor 115 then renders an updated current instance of the data model within a single view (e.g., single screen) or within a dashboard view of other interface screens of resource health interface 125 for viewing by a user associated with a given enterprise. The overall search health value may be distinguishable within the single view based on its prominence, location, and/or visual attributes.

The single view can be rendered within a screen of interface 125 in a variety of manners and with a variety of configured levels of detail for viewing by an authorized user of the enterprise. A few examples of the formats, types of information, and visual attributes for the single view are now presented with reference to FIG. 1B and FIG. 1C.

Figure 1B:
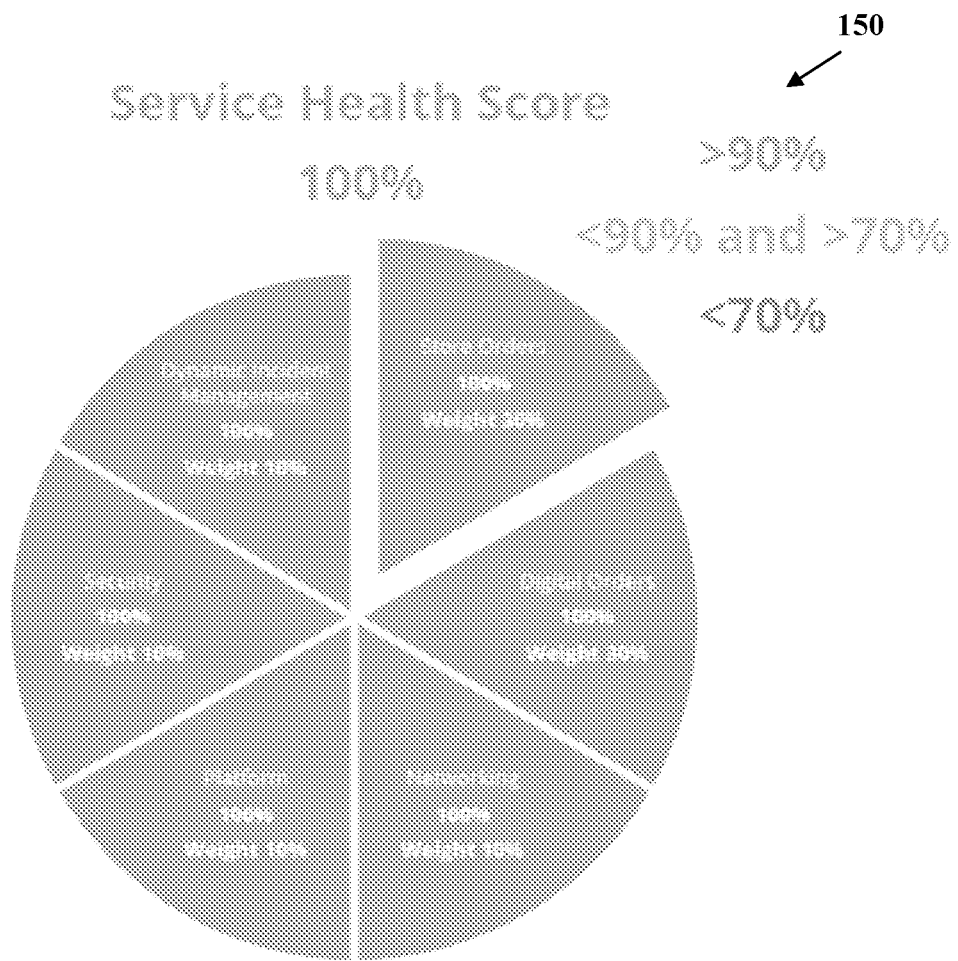
FIG. 1B is an example screenshot rendered through an interface depicting a graphic illustrating an overall health for internal and distributed resources associated with the environment monitoring, according to an example embodiment.

The screenshot 150 (e.g., single view 150) illustrated in FIG. 1B depicts a pie chart (e.g., graphical object) showing an enterprise's overall service health at a specific point in time (e.g., when requested) as being 100% and further illustrates that different ranges of overall service health values can be represented as being stellar in the case of 100%, good when greater than 90%, concerning and potentially requiring attention when between 70% and 90%, and requiring immediate attention when less than 70%. Each of the different ranges of stellar, good, concerning, requiring attention can be rendered within the single view with a preassigned color, such as green for both stellar and good, yellow for concerning, and red for requiring attention.

In an embodiment, the ranges depicted in FIG. 1B are configurable based on the enterprise. The ranges may be provided to resource monitor 115 as processing parameters or may be obtained by resource monitor 115 from a configuration file.

Figure 1C:
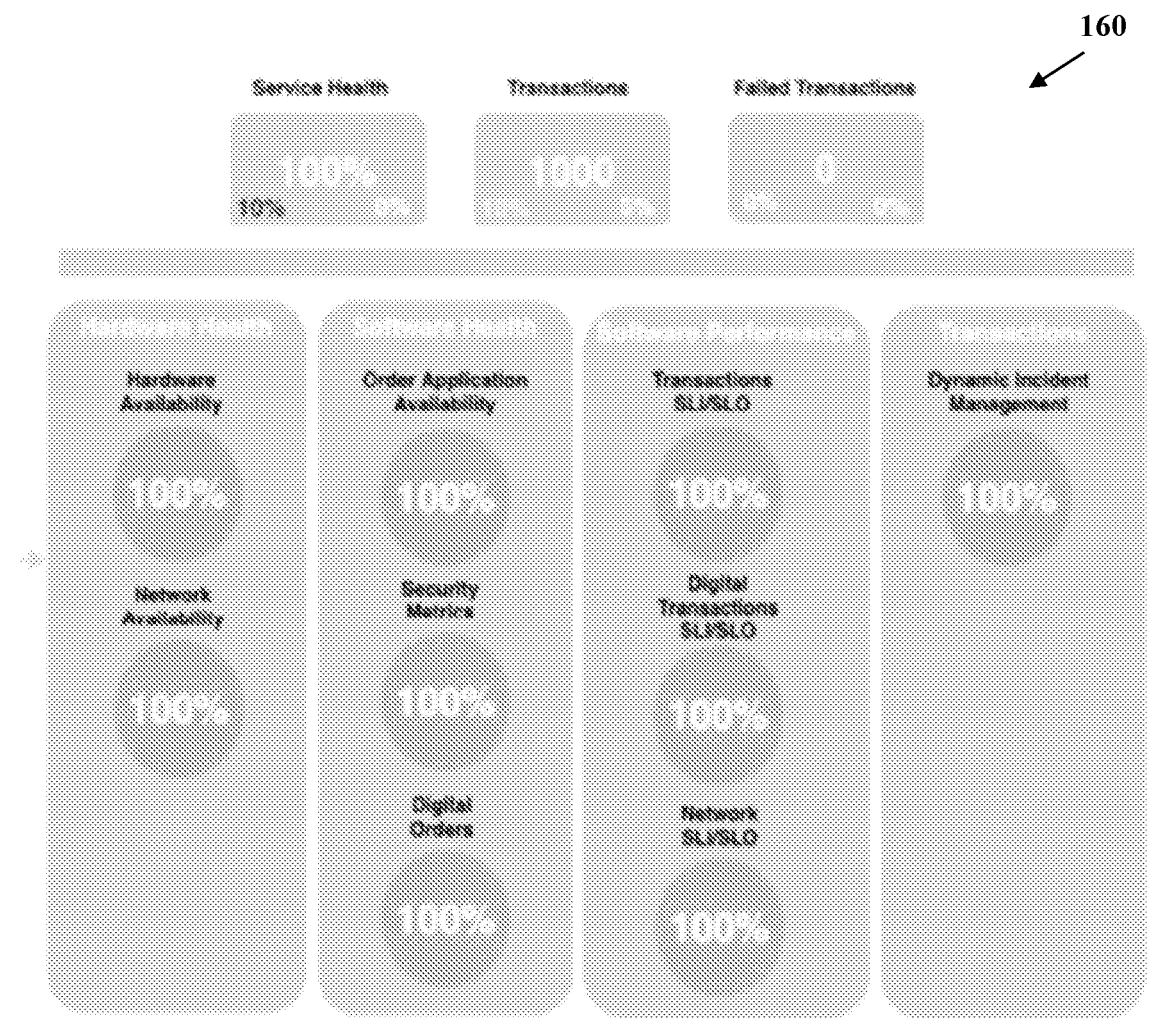
FIG. 1C is another example screenshot rendered through an interface depicting another graphic within a single view illustrating fine-grain detail for an overall heal of internal and distributed resources associated with the environment monitoring, according to an example embodiment.

The screenshot 160 (single view 160) illustrated in FIG. 1C depicts a single table (e.g., one or more graphical objects) of the overall service health and is represented with a finer-grain level of detail from that which was presented in FIG. 1B. Service health (represented as 100% the top left rectangle in FIG. 1B) is rendered with the overall service health value of 100% for a given interval of time, such as last 24-hour period.

The overall service health in the single table view of FIG. 1C includes additional aggregated metric values, such as an overall percentage increase/decrease from the current overall service health value for the current date experienced last year by the enterprise as 10% decrease (bottom left of the service health rectangle) (i.e., last year's overall service health on the current day was 90% (10% decrease from the current overall service health of 100%)). It is noted that percentage decreases can be rendered with a distinctive color such as red while a percentage increase can be illustrated with a different distinctive color such as green. The service health rectangle can also include a prediction for a next day's percentage change in service health from the current service health value, shown as 0% change in FIG. 1C (bottom right of service health rectangle).

The single table view 160 of FIG. 1C also shows two separate aggregated metric types combine as the transaction rectangle (in-store and digital transactions combined) shown as the middle top rectangle. The bottom left of the transaction rectangle shows a 10% increase in transactions on the current data last year and the bottom right shows a 5% change in the current day's total transactions are predicted for the next day.

Failed transactions (shown as top right rectangle) shows a total number of failed transactions for the current date; bottom left shows a 0% change from the current date last year; and bottom right shows a 0% change predicted for the next day. Failed transaction are transaction initiated but failed to complete for any reason.

Hardware health (shown as the leftmost elongated rectangle) shows the current date's hardware availability and network availability. Software health (shown as the second from the left elongated rectangle) shows order application availability (e.g., specific type of resource), security metrics, and digital orders for the current date. Software Performance (shown as the third from the left elongated rectangle) shows the transactions SLIs/SLOs, digital transactions SLIs/SLOs, and network SLIs/SLOs for the current date (this shows how well vendors are performing relative to their SLIs/SLOs with the enterprise). Transactions (shown as the rightmost rectangle) shows digital incident management (e.g., successful payments processed versus failed payments for the transactions) for the current date.

Again, the service health value represents a calculation performed on the weighted aggregated metric data values for the corresponding aggregated metric types. This calculation can be addition, or any other configured calculation based on the enterprise.

In an embodiment, system 100 may also include one or more machine-learning models (MLMs) trained to provide the predictions (illustrated in the bottom right of the three topmost rectangles). In an embodiment, at least one MLM may be trained in time-series mode to predict further transactions based on historic transaction data of the enterprise. The output of the MLM may be a total number of transactions predicted for the enterprise (e.g., or store of a given enterprise) during the current period of time. This prediction may be provided in the current instance of the data model within the single view and may be used by the enterprise to determine how many transaction are likely being missed when the overall health value is less than 100%. For example, if a prediction of 100 transactions is provided for a current hour or a current day and the overall health is at 85% with an actual completed transaction total of 87, the enterprise can assume that 13 transaction are going to be missed because health is not at 100%. Further inspection of the single view may show that the network availability is at 70% with one website currently unavailable for online transactions. The enterprise user may escalate that information through the enterprise's IT system 123 or with a particular vendor that provides the website to make bringing that website back online a priority to minimize lost transactions.

In an embodiment, system 100 obtains the predictions from either a resource of the enterprise or a resource of a vendor (e.g., the enterprise or the vendor generating the prediction via trained MLMs). That is, each enterprise may utilize different trained MLMs for different predictions some may be internal, and some may be provided through vendors. These predictions can be provided through APIs 114 and 115 and populated into the current instance of the data model for rendering within the single view to the enterprise user.

In an embodiment, resource monitor 115 generates a variety of custom views (e.g., screens) within resource health interface 125. Each screen providing options or links for obtaining a user-driven level of detail for the aggregated metric data values associated with the current instance of the data model via monitor 115. For example, the SLIs/SLOs when below 100% can be clicked by a user within the corresponding table view and details of the corresponding vendor's metric data values can be viewed along with the agreed to or expected metric data values and/or expected metric data value ranges from the corresponding metric type associated with the corresponding SLIs/SLOs. This allows the enterprise user to have an up-to-date status as to how each vendor is performing relative to the agreed level of support/service.

In an embodiment, within any given view rendered by monitor 115, monitor 115 maintains a dashboard view that provides the level of detail illustrated in the pie chart view of the FIG. 1B. The dashboard may be oriented along the top, bottom, or any side of the single view or of any of the given view. The information presented in the dashboard view includes at least the information depicted in FIG. 1B; however, it is noted that the dashboard view may also include finer-grain information such as what is shown in the FIG. B. The type of information, location of the information, and/or any visual attributes of that information within the dashboard view may be configured for each different enterprise.

In an embodiment, resource monitor 115 receives the metric data values as event data for events associated with a given metric/event type. The events are detected in real time and the corresponding metric data values are updated from retail servers 120, store servers 130, and vendor servers 140. In this embodiment, a workflow and APIs are provided to the enterprises, stores, and vendors to push the updated metric data values or event data in real time to resource monitor 115.

In an embodiment, a workflow or a pipeline associated with reporting events (e.g., event data) by servers 120, 130, and 140 can be modified to use the APIs 114 and 115 and push the event data to resource monitor 115. Resource monitor 115 processes the events and the events' data to maintain up-to-date metric data values for the metrics. In this embodiment, events' data and events' types are passed and the corresponding mapping to metric types and metric data values are performed by resource monitor 115 (e.g., using a schema).

The embodiments of FIGS. 1A-1C and other embodiments are now discussed with reference to the FIGS. 2A, 2B, 2C, and 3. It is to be noted that any embodiment illustrated in FIGS. 1A-1C may also be an embodiment with method 200 and/or method 300. Furthermore, unless otherwise stated, the embodiments are not exclusive from one another meaning that one, any combination, or all of the embodiments may be used in combination.

Figure 2A:
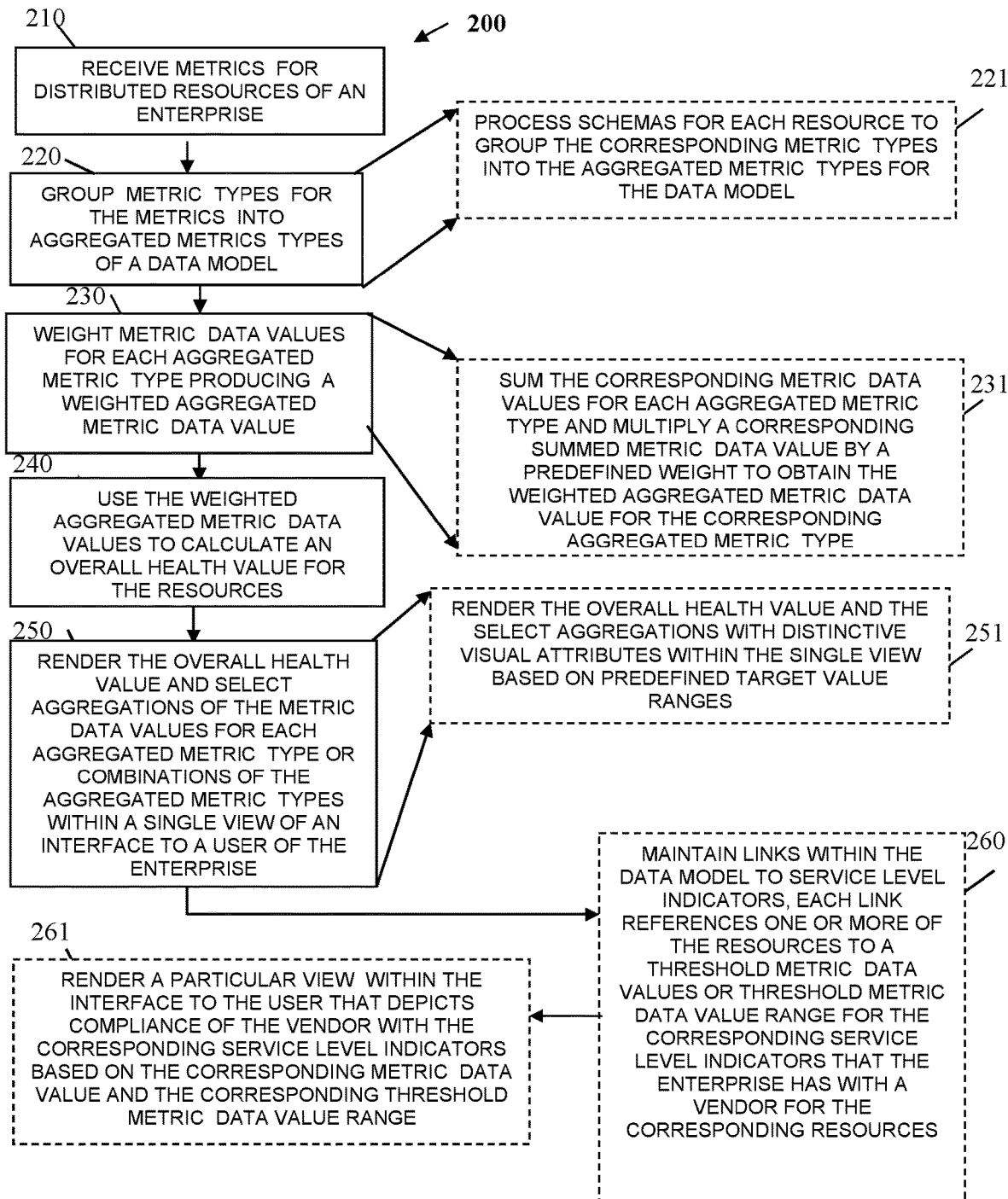
FIG. 2A is a diagram of a method for integrated process environment monitoring of distributed resources, according to an example embodiment.
Figure 2B:
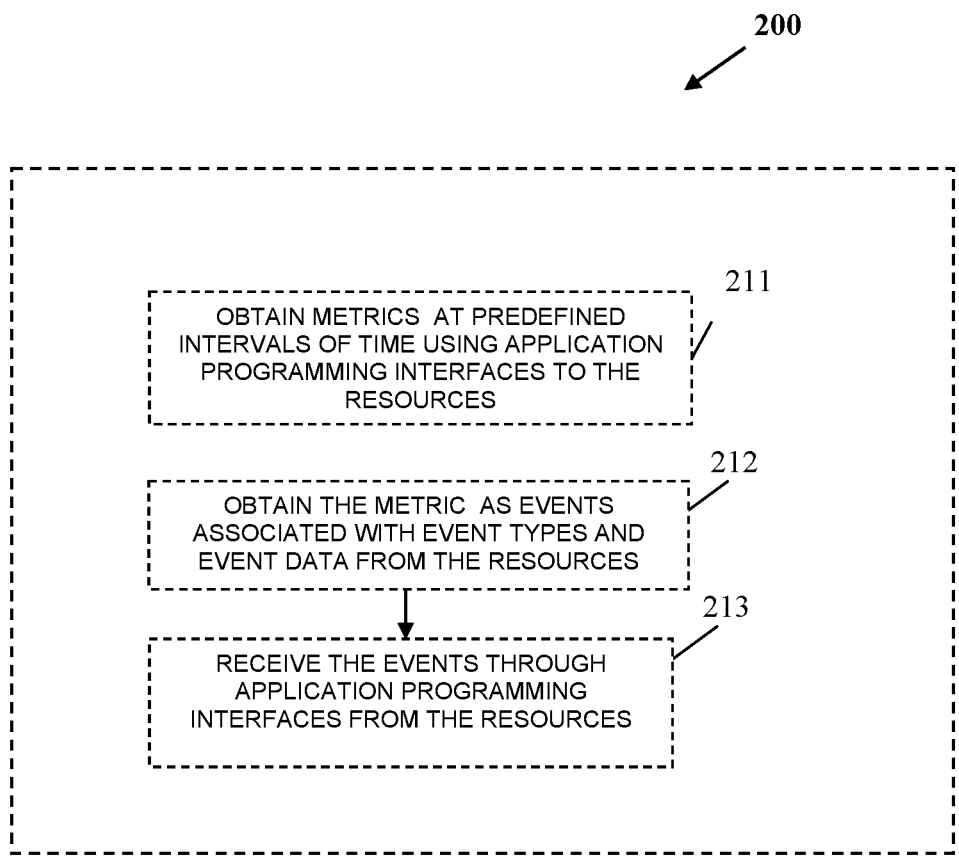
FIG. 2B is a diagram of embodiments for the method of FIG. 2A.
Figure 2C:
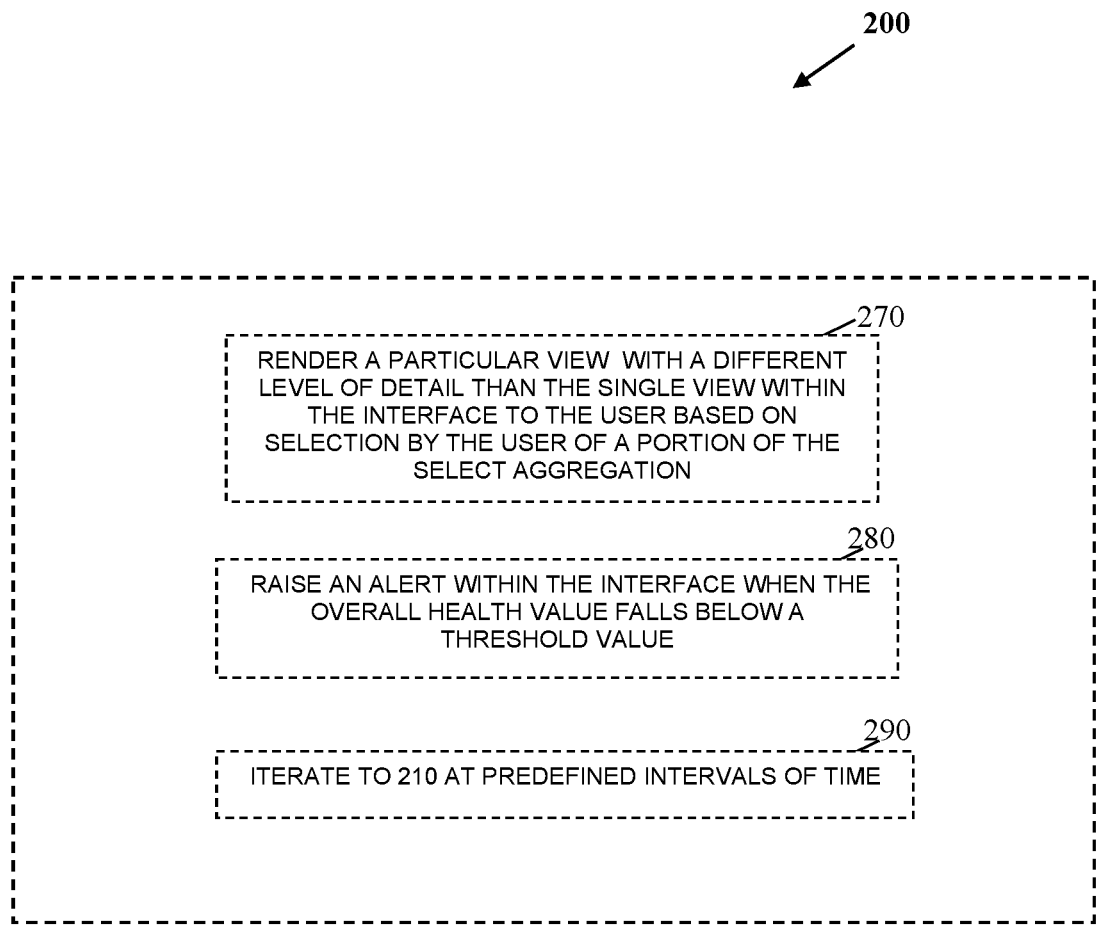
FIG. 2C is a diagram of further embodiments for the method of FIG. 2A.

FIGS. 2A, 2B, and 2C are diagrams of a method 200 for integrated process environment monitoring of distributed resources, according to an example embodiment. The software module(s) that implements the method 200 is referred to as an "operations health monitor." The operations health monitor is implemented as executable instructions programmed and residing within memory and/or a non-transitory computer-readable (e.g., processor-readable) storage medium and executed by a plurality of hardware processors of a plurality of hardware computing devices. The processors of the devices that execute the operations health monitor are specifically configured and programmed to process the operations health monitor. The operations health monitor has access to one or more networks during its processing. The networks can be wired, wireless, or a combination of wired and wireless.

In an embodiment, the devices that execute the operations health monitor is cloud 110 and/or server 110. In an embodiment, the operations health monitor is all or some combination of 113, 114, and/or 115.

At 210, the operations health monitor receives metrics for distributed resources (121-124, 131-133, and 141-142) of an enterprise. The manner in which the metrics are received can vary. Moreover, the operations health monitor can receive some metrics differently than how other metrics are obtained, such that the embodiments that follow are not mutually exclusive to one another and can be combined with one another in some embodiments.

In an embodiment, at 211 (shown in FIG. 2B), the operations health monitor obtains metrics at predefined intervals of time using APIs (113 and 114). Operations health monitor can receive metrics that are pushed via APIs 113 at the predefined intervals of time from systems (123, 124, 132, and 133) to the operations health monitor and/or metrics that are pushed via APIs 114 at the predefined intervals of time from resource metric reporter 142 to the operations health monitor.

In an embodiment, at 212 (shown in FIG. 2B), the operations health monitor obtains the metrics as events associated with event types and event data from the resources. That is, the resources 121, 131, and 141 produce events that are trapped and recorded within logs or data stores. Furthermore, the systems (123, 124, 132, and 133) may also generate events that are trapped and recorded within logs or data stores. Operations health monitor can access these logs and data stores to identify the events and the corresponding event data and associate one or more combinations of the event data as particular metrics that are to be captured and monitored.

In an embodiment of 212 and at 213 (shown in FIG. 2B), the operations health monitor receives the events through APIs (113 and 114) from the resources (121-124, 131-133, and 141-142). Furthermore, the events and corresponding event data may be provided from the resources, which the Operations health monitor associates with one or more combinations as particular metrics that are to be captured and monitored.

At 220, the operations health monitor groups the metric types for the metrics into aggregated metric types of a data model. A schema may be used that permits operations health manager to associate multiple metric types for the metrics into a particular aggregated metric type defined in the data model. This permits operations health monitor to parse the schema when a given metric is received, link the metric to a particular aggregated metric type in the data model, and increase a running total metric data value for the corresponding aggregated metric type with the metric data value associated with the corresponding metric.

In an embodiment, at 221, the operations health monitor processes schemas for each resource to group the corresponding metric types into the aggregated metric types for the data model. That is, each resource of system from which metrics are received may have its own independent schema for its metrics and its metric types. Each schema when parsed for an incoming metric causes operations health monitor to update a running total for the corresponding aggregated metric type in the data model with that metric's data values. The running total for any given aggregated metric type may also be referred to as an aggregated metric data value.

At 230, the operations health monitor weights the metric data values for each aggregated metric type to obtain a weighted aggregated metric data value. That is, each running total (aggregated metric data value) for each aggregated metric type is weighted with a predefined and a configurable weight to produce an adjusted or a weighted aggregated metric data value (e.g., weighted running total) that is maintained within the data model for the corresponding aggregated metric type.

In an embodiment of 230 and, optionally 220, at 231, the operations health monitor sums the corresponding metric data values for each aggregated metric type and multiplies a corresponding summed metric data value by a predefined weight to obtain the weighted aggregated metric data value for the corresponding aggregated metric type. It is to be noted that this can be done in other manners as well. For instance, an average can be calculated, or a mean can be calculated for the aggregated metric data values of a given aggregated metric type; the average or the mean is then multiplied by the predefined weight. In fact, more complicated calculations can be processed based on the significance of each aggregated metric type relative to the overall health value for a given enterprise.

At 240, the operations health monitor uses the weighted aggregated metric data values to calculate an overall health value for the resources of the enterprise. Again, this can be by summing the weighted aggregated metric data values together or by more complicated calculations, such as combining two or more aggregated metric data values to derive an intermediate sum, which is then multiplied by a different factor and added to a sum of the remaining aggregated metric data values to arrive at the overall health value.

At 250, the operations health monitor renders the overall health value and select aggregations of the metric data values for each aggregated metric type or combinations of the aggregated metric type within a single view of an interface 125 to a user of the enterprise. Example single views (e.g., single screen shots) were shown in FIGS. 1B and 1C. It is to be noted that additional information regarding each aggregated metric type, select combinations of the aggregated metric types, combinations of metric data values that span multiple aggregated metric types, etc. may also be rendered within the single view (e.g., as is depicted in FIGS. 1B and 1C).

In an embodiment, at 251, the operations health monitor renders the overall health value and the select aggregations with distinctive visual attributes within the single view based on predefined target value ranges. The visual attributes can be color based, font effects, etc. The operations health monitor may determine and assign the visual attributes based on comparisons between the overall health value, the weighted aggregated metric data values, and/or the aggregated metric data values against predefined ranges of values. The visual attributes allow an enterprise used to quickly ascertain whether or not immediate action is needed by the enterprise to avoid loss.

In an embodiment, at 260, the operations health monitor maintains links within the data model to SLIs. Each mapping link references one or more of the resources to a threshold metric data value or a threshold metric data value range for the corresponding SLIs that the enterprise has with a vendor for the corresponding resource.

In an embodiment of 260 and at 261, the operations health monitor renders a particular view within the interface 125 to the user that depicts compliance of the vendor with the corresponding SLIs based on the corresponding metric data values and the corresponding metric data value range. That is, visual effects and/or graphical objects rendered within the particular view may depict, based on the current metric data values for the enterprise, whether given SLIs are or are not in compliance for the vendor.

In an embodiment, at 270 (shown in FIG. 2C), the operations health monitor renders a particular view with a different level of detail than the single view within the interface 125 to the user based on selection by the user of a portion of the select aggregation. The interface 125 may be interactive, such that each of the aggregated metric data values from the single view are selectable by the user. A selection causes operations health monitor to provide more detailed information about the selected aggregated metric data value in the particular view, such as the unweighted aggregated metric data values by resource or by system, compliance to given SLIs for each resource of system, etc.

In an embodiment, at 280 (shown in FIG. 2C), the operations health monitor raises an alert within the interface 125 when the overall health value falls below a threshold value. For example, a popup message may indicate that network bandwidth is being degraded such that new bandwidth needs to be brought online; more SSTs should be opened at store X because the transaction throughput is too slow; server Y should be taken offline as there are too many anonymous Internet Protocol (IP) requested pinging that server; etc.

In an embodiment, at 290 (shown in FIG. 2C), the operations health monitor iterates back to 210 at predefined intervals of time for updated metrics. The operations health monitor maintains historical data for the instances of the data model and continuously at the predefined intervals of time produces a new updated current instance of the data model. The historical data may be processed to produce reports showing trendlines and/or used as training to MLMs for predictions used in the current instance of the data model.

Figure 3:
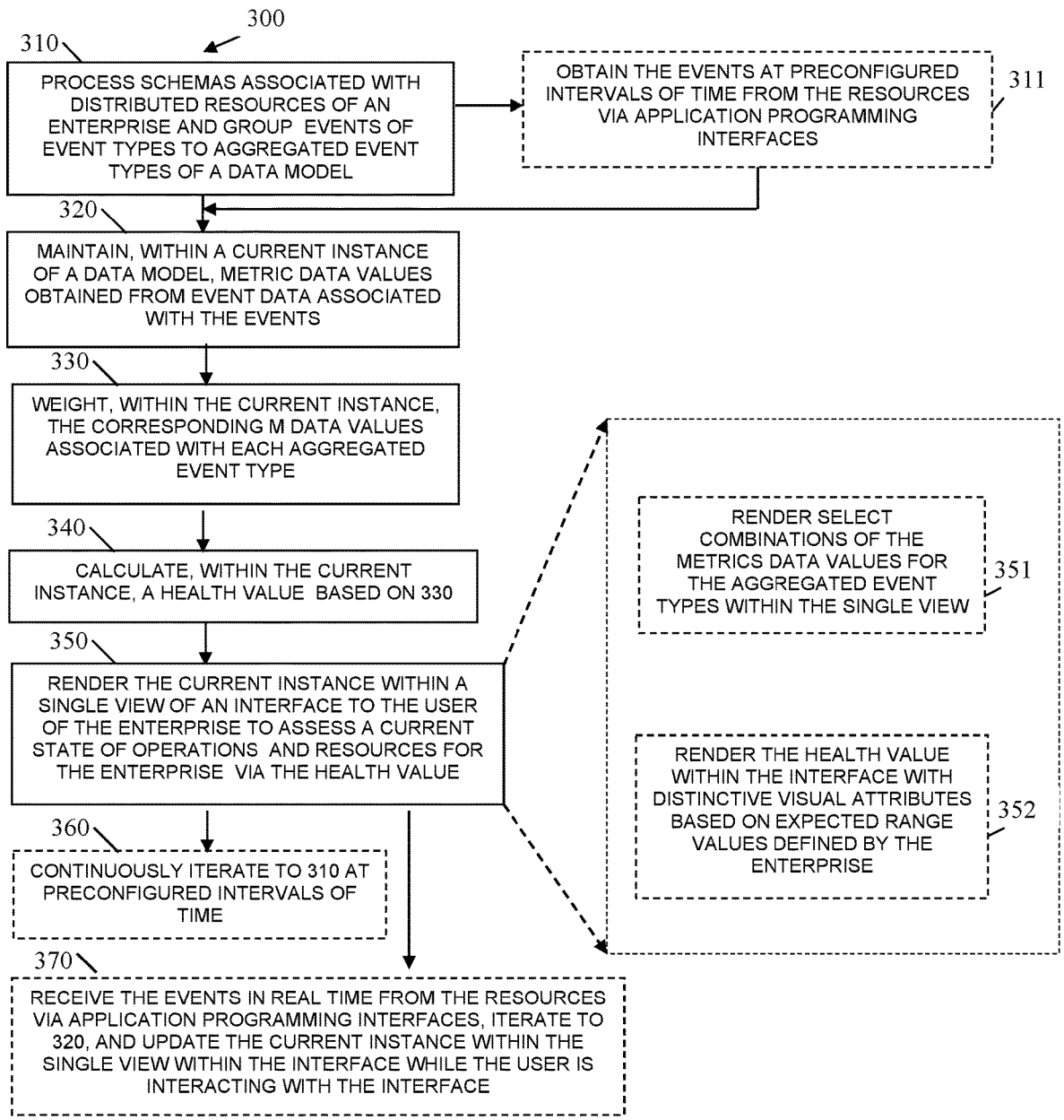
FIG. 3 is a diagram of another method for integrated process environment monitoring of distributed resources, according to an example embodiment.

FIG. 3 is a diagram of another method 300 for integrated process environment monitoring of distributed resources, according to an example embodiment. The software module(s) that implements the method 300 is referred to as a "resource metrics aggregator." The resource metrics aggregator is implemented as executable instructions programmed and residing within memory and/or a non-transitory computer-readable (processor-readable) storage medium and executed by one or more hardware processors of one or more hardware devices. The processors of the devices that execute the resource metrics aggregator are specifically configured and programmed to process the resource metrics aggregator. The resource metrics aggregator has access to one or more networks during its processing. The networks can be wired, wireless, or a combination of wired and wireless.

The resource metrics aggregator presents another and, in some ways, enhanced processing perspective of that which was described above with the method 200 and with system 100. In an embodiment, cloud 110 executes the resource metrics aggregator. In an embodiment, server 110 executes the resource metrics aggregator. In an embodiment, the resource metrics aggregator is all or some combination of 113, 114, 115, and/or method 200.

At 310, the resource metrics aggregator processes schemas associated with distributed resources (121-124, 131-133, and 141-142) of an enterprise and groups events of event types to aggregated event types of a data model. Each schema identifies translation from the corresponding event types to corresponding aggregated event types.

In an embodiment, at 311, the resource metrics aggregator obtains the events at preconfigured intervals of time from the resources via the APIs (113 and 114). Here, the events are obtained at preconfigured intervals through APIs (113 and 114) from systems (123, 124, 132, and 133) and resource metric reporters 142. Additionally, resource metrics aggregator may obtain some of the events from logs or data stores written to by systems (123, 124, 132, and 133) and resource metric reporters 142. Thus, the metrics may be pushed from the resources and/or obtained from logs or data stores. The resource metrics aggregator may also request the events at preconfigured intervals of time from the resources via APIs (113 and 114). That is, the events are pulled at predefined intervals by API requests made to systems (123, 124, 132, and 133) and resource metric reporters 142. So, the events can be obtained by pulling the events from the resource via requests through the APIs; pushing, by the resources, the events to the resource metrics aggregator; and/or reading the events from logs and/or data sources.

At 320, the resource metrics aggregator maintains, within a current instance of the data model, metric data values obtained from event data associated with the events. Resource metrics aggregator associates the event data for the events with aggregated event types defined in the schemas for the data model to populate and maintain running totals of metric data values with each aggregated metric type within the current instance of the data model.

At 330, the resource metrics aggregator weights, within the current instance of the data model, the corresponding metric data values associated with each aggregated event type. For each aggregated event type, a predefined weight may be applied to the current running total associated with the corresponding metric data values to determine an adjusted running total for each aggregated event type within the current instance of the data model.

At 340, the resource metrics aggregator calculates, within the current instance of the data model, a health value based on 330. The adjusted current running totals are used to calculate a single value representing a health value that is indicative of a current state of operations and resources for a given enterprise at any given point in time. In an embodiment, the adjusted (e.g., weighted) running totals are summed to calculate the health value; however, it is to be noted that other adjustments can be done to calculate the health value (e.g., selectively combining sums of two or more adjusted running totals and multiplying the sum by a different predefined weight and then adding the result with the sum of the other remaining adjusted running totals, etc.).

At 350, the resource metrics aggregator renders the current instance of the data model within a single view of an interface 125 to a user of the enterprise to assess a current state of operations for the enterprise via the health value. In an embodiment, the single view (e.g., single screenshot 150) may be rendered as a pie graph (e.g., such as FIG. B) where the health value may be expressed as a percentage of 100, each slice of the pie depicted a label identifying its aggregated event type and includes its percentage of the overall health value along with the weight that was applied at 330 to that aggregated event type. In an embodiment, the single view (single screenshot 160) may be rendered as a graphic (e.g., such as FIG. 1C) where the health value is depicted in a box graphic with its percentage value along with percentage changes in the health value vis-a-vis last year on this data (e.g., shown as 10%) and the predicted percentage change expected for tomorrow (e.g., such as 0%). The single view may also include selective combinations of the metric values for each aggregated event type or selective combinations of metric values for combinations of the aggregated event types (e.g., such as is illustrated in FIG. 1B) as the graphic boxes labeled Transactions, Failed Transactions, Hardware Health, Software Performance, and a second Transactions for Dynamic Incident Management.

In an embodiment, at 351, the resource metrics aggregator renders select combinations of the metric data values for the aggregated event types within the single view of the interface 125. This was discussed above with 350 and is further illustrated in FIG. 1B.

In an embodiment, at 352, the resource metrics aggregator renders the health value within the interface 125 with distinctive visual attributes based on expected range values defined by the enterprise (such as was discussed above with FIG. 1B. For example, a color of the health value rendered within the single view may provide an indication as to whether operations and resources are in great shape (e.g., green), okay (e.g., blue), or needs attention (e.g., red). This is a way for the enterprise user to quickly access the state of the enterprise and whether or not any remedial actions are needed by the enterprise. The visual attributes can be configured and changed based on comparison of a current health value to a predefined range of health values. It is to be noted that the single view may include a variety of other aggregated event types, combinations of specific metric data values that span different aggregated event types, and the like. Each additional data point depicted within the single view may include its own distinctive visual attributes such that the focus and attention of the enterprise users is drawn to specific aspects of operations or resources that need addressed by the enterprise.

In an embodiment, at 360, the resource metrics aggregator continuously iterates back to 310 at preconfigured intervals of time for updated events. That is, a current instance of the data model may be available at any point in time since resource metrics aggregator can be continuously obtaining events at predefined intervals of time. Resource metrics aggregator may also save past instances of the data model as a history, which can be viewed through interface 125, can be processed for reporting purposes to show trends, and can be used as training to MLMs (e.g., as discussed above).

In an embodiment, at 370, the resource metrics aggregator receives the events in real time from the resources via APIs (113 and 114). Resource metrics aggregator iterated back to 320 and updates the current instance of the data model in real time while the user is interacting with the interface and viewing an updated single view (e.g., 150, 160, etc.).

It should be appreciated that where software is described in a particular form (e.g., such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving metrics for distributed resources of an information technology (IT) system or data center of an enterprise;
   grouping metric types for the metrics into aggregated metric types of a data model, wherein the data model is a data structure representing a normalized version of the metric types for distributed resources of the IT system or data center, wherein grouping further includes processing schemas for each distributed resource to group corresponding metric types into the aggregated metric types of the data model;
   weighting metric data values for each aggregated metric type producing a weighted aggregated metric data value for each aggregated metric type, weighting further includes summing corresponding metric data values for each aggregated metric type and multiplying a corresponding summed metric data value by a predefined weight to produce the weighted aggregated metric data value for a corresponding aggregated metric type;
   using the weighted aggregated metric data values and calculating an overall health value for the distributed resources; and
   rendering the overall health value and select aggregations of the metric data value for each aggregated metric type or combinations of the aggregated metric types within a single view of an interface to a user of the enterprise, wherein the overall health value is a single value representing the overall health of the distributed resources of the IT system or the data center.

2. The method of claim 1, wherein receiving further includes obtaining the metrics at predefined intervals of time using Application Programming Interfaces (APIs) to the distributed resources.

3. The method of claim 1, wherein receiving further includes obtaining the metrics as events associated with event types and event data from the distributed resources.

4. The method of claim 3, wherein obtaining further includes receiving the events through Application Programming Interfaces (APIs) from the distributed resources.

5. The method of claim 1, wherein rendering further includes rendering the overall health value and the select aggregations with distinctive visual attributes within the single view based on predefined target value ranges.

6. The method of claim 1 further comprising, maintaining links within the data model to Service Level Indicators (SLIs), wherein each link references one or more of the distributed resources to a threshold metric data value or threshold metric data value range for the corresponding SLIs that the enterprise has with a vendor for the corresponding distributed resources.

7. The method of claim 6 further comprising, rendering a particular view within the interface to the user that depicts compliance of the vendor with the corresponding SLIs based on the corresponding metric data values and the corresponding threshold metric data value or the corresponding threshold metric data value range.

8. The method of claim 1 further comprising, rendering a particular view with a different level of detail than the single view within the interface to the user based on selection by the user of a portion of the select aggregations.

9. The method of claim 1 further comprising, raising an alert within the interface when the overall health value falls below a threshold value.

10. The method of claim 1 further comprising, iterating the receiving at predefined intervals of time.

11. A method, comprising:
processing schemas associated with distributed resources of an information technology (IT) system or data center for an enterprise and grouping events of event types into aggregated event types of a data model, wherein grouping further includes processing a corresponding schema for each distributed resource to group corresponding event types into the aggregated event types of the data model;
maintaining, within a current instance of the data model, metric data values obtained from event data associated with the events, wherein the data model is a data structure representing a normalized version of the event types for distributed resources of the IT system or data center;
weighting, within the current instance of the data model, the corresponding metric data values associated with each aggregated event type, wherein weighting further includes summing the corresponding metric data values for each aggregated event type and multiplying a corresponding summed metric data value by a predefined weight to produce a corresponding weighted aggregated metric data value for a corresponding aggregated event type;
calculating, within the current instance of the data model, a health value based on the weighting, wherein the health value is a single value representing the overall health of the distributed resources of the IT system or the data center; and
rendering the current instance of the data model within a single view of an interface to a user of the enterprise to assess a current state of operations and the distributed resources for the enterprise via the health value.

12. The method of claim 11 further comprising, continuously iterating the processing at preconfigured intervals of time.

13. The method of claim 11, wherein processing further includes requesting the events in real time from the distributed resources via Application Programming Interfaces (APIs).

14. The method of claim 11, wherein processing further includes obtaining the events at preconfigured intervals of time from the distributed resources via Application Programming Interfaces (APIs).

15. The method of claim 11, wherein rendering further includes rendering selective combinations of the metric data values for the aggregated event types within the single view.

16. The method of claim 11, wherein rendering further includes rendering the health value within the interface with distinctive visual attributes based on expected range values defined by the enterprise.

17. A system comprising:
a service comprising at least one processor and a non-transitory computer-readable storage medium;
the non-transitory computer-readable storage medium comprising executable instructions;
the executable instructions when provided to or obtained by the at least one processor from the non-transitory computer-readable storage medium cause the at least one processor to perform operations, comprising:
receiving metrics for distributed resources of an information technology (IT) system or a data center of an enterprise;
grouping metric types for the metrics into aggregated metric types of a data model, wherein the data model is a data structure representing a normalized version of the metric types for distributed resources of the IT system or data center, wherein grouping further includes processing a corresponding schema for each distributed resource to group corresponding metric types into the aggregated metric types of the data model;
weighting metric data values for each aggregated metric type producing a weighted aggregated metric data value for each aggregated metric type, wherein weighting further includes summing corresponding metric data values for each aggregated metric type and multiplying a corresponding summed metric data value by a predefined weight to produce a corresponding weighted aggregated metric data value for a corresponding aggregated metric type;
using the weighted aggregated metric data values to calculate an overall health value for the resources of the enterprise, wherein the overall health value is a single value representing the overall health of the distributed resources of the IT system or the data center; and
rendering the overall health value and select aggregations of the metric data value for each aggregated metric type or combinations of the aggregated metric types within a single view of an interface to a user of the enterprise.

18. The system of claim 17, wherein executable instructions when provided to or obtained by the at least one processor from the non-transitory computer-readable storage medium further cause the at least one processor to perform additional operations, comprising:

maintaining a dashboard view within single view and within other views of the interface as the user interacts with the interface and changes from the single view to any of the other views, wherein the dashboard view presents the single view in a summarized format along a top, a bottom, or a side of the single view and each of the other views.

\* \* \* \* \*